(12) United States Patent
Morikawa

(10) Patent No.: US 10,767,606 B2
(45) Date of Patent: *Sep. 8, 2020

(54) TUBULAR AIR CLEANER FOR INTERNAL COMBUSTION ENGINE AND TUBULAR FILTER ELEMENT

(71) Applicant: TOYOTA BOSHOKU KABUSHIKI KAISHA, Aichi-ken (JP)

(72) Inventor: Hiroaki Morikawa, Kitanagoya (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 157 days.

This patent is subject to a terminal disclaimer.

(21) Appl. No.: 15/819,689

(22) Filed: Nov. 21, 2017

(65) Prior Publication Data

US 2018/0149117 A1 May 31, 2018

(30) Foreign Application Priority Data

Nov. 30, 2016 (JP) ................. 2016-233024

(51) Int. Cl.
*F02M 35/02* (2006.01)
*B01D 46/24* (2006.01)
*B01D 53/04* (2006.01)
(Continued)

(52) U.S. Cl.
CPC ..... *F02M 35/0201* (2013.01); *B01D 46/0036* (2013.01); *B01D 46/2411* (2013.01);
(Continued)

(58) Field of Classification Search
CPC ............ B01D 53/0415; B01D 46/2411; B01D 46/521; B01D 53/0407; B01D 46/0036;
(Continued)

(56) References Cited

U.S. PATENT DOCUMENTS 3,873,287 A * 3/1975 Barnebey ........... B01D 46/0013
96/129
2006/0107836 A1* 5/2006 Maier ................ B01D 46/0024
96/134
(Continued)

FOREIGN PATENT DOCUMENTS

CN 101275519 10/2008
JP 48-36212 U 5/1973
(Continued)

OTHER PUBLICATIONS

Office Action issued in China Counterpart Patent Appl. No. 201711202288.0, dated Aug. 2, 2019, along with an English translation thereof.
(Continued)

*Primary Examiner* — Minh Chau T Pham
(74) *Attorney, Agent, or Firm* — Greenblum & Bernstein, P.L.C.

(57) ABSTRACT

A tubular air cleaner for an internal combustion engine includes a tubular housing, which includes a circumferential wall including an inlet, a top wall including an outlet, and a bottom wall opposed to the top wall, and a tubular filter element, which includes a tubular filter portion and is accommodated in the housing. A frame is arranged at an inner side of the filter portion to maintain shape of the filter portion. A planar adsorbent filter, which adsorbs evaporated fuel of the internal combustion engine, extends in an axial direction of the filter portion and is fixed to the frame. The inner surface of the filter portion is spaced apart from each of opposite planes of the adsorbent filter by a gap that allows air to reach the outlet without passing through the adsorbent filter.

6 Claims, 4 Drawing Sheets

(51) Int. Cl.
*B01D 46/00* (2006.01)
*B01D 46/52* (2006.01)
*F02M 25/08* (2006.01)
*F02M 35/024* (2006.01)

(52) U.S. Cl.
CPC ....... *B01D 46/521* (2013.01); *B01D 53/0407* (2013.01); *B01D 53/0415* (2013.01); *F02M 25/089* (2013.01); *F02M 25/0854* (2013.01); *F02M 35/02483* (2013.01); *B01D 2253/102* (2013.01); *B01D 2257/702* (2013.01); *B01D 2259/4566* (2013.01); *B01D 2279/60* (2013.01)

(58) Field of Classification Search
CPC ............ B01D 2259/45; B01D 2279/60; B01D 2253/102; F02M 35/0201; F02M 35/02483; F02M 25/0854; F02M 25/089
USPC ......... 55/385.3, 498, 502, 497, 521; 96/147, 96/148; 123/198 E
See application file for complete search history.

(56) References Cited

U.S. PATENT DOCUMENTS

| | | |
|---|---|---|
| 2010/0089368 A1 | 4/2010 | Hirata et al. |
| 2018/0147525 A1* | 5/2018 | Morikawa .......... B01D 46/2411 |
| 2018/0149118 A1* | 5/2018 | Morikawa .......... B01D 46/2411 |
| 2018/0149119 A1* | 5/2018 | Morikawa .......... B01D 46/0002 |

FOREIGN PATENT DOCUMENTS

| | | |
|---|---|---|
| JP | 2001-123897 | 5/2001 |
| JP | 2009-138669 A | 6/2009 |

OTHER PUBLICATIONS

Notice of Reasons for Refusal received in JP Application No. 2016-233024 and English translation thereof, dated May 26, 2020.

* cited by examiner

TUBULAR AIR CLEANER FOR INTERNAL COMBUSTION ENGINE AND TUBULAR FILTER ELEMENT

BACKGROUND ART

The present invention relates to a tubular air cleaner arranged in an intake air passage of an internal combustion engine and a tubular filter element adapted for use with the tubular air cleaner.

A prior art tubular air cleaner for an internal combustion engine includes a tubular housing and a tubular filter element. The housing includes a circumferential wall including an inlet, a top wall including an outlet, and a bottom wall opposed to the top wall. The filter element is accommodated in the housing.

The tubular filter element includes a pleated tubular filter portion, which is formed by pleating a filter medium sheet, and two sealing portions, which are arranged on opposite ends of the filter portion in an axial direction to seal the space between the top wall and the bottom wall of the housing.

Japanese Laid-Open Patent Publication No. 2001-123897 discloses a filter element that includes a filter portion and an inner tube, which is arranged at an inner side of the filter portion. The inner tube includes an adsorbent, which adsorbs evaporated fuel, and has a number of air holes.

SUMMARY OF THE INVENTION

The filter element described in Japanese Laid-Open Patent Publication No. 2001-123897 has the drawback of increasing the airflow resistance. The reason is that although the inner tube has a number of air holes, the inner tube blocks a passage through which the air flows. Therefore, there is room for improvement to reduce the air pressure loss.

It is an object of the present invention to provide a tubular air cleaner for an internal combustion engine and a tubular filter element that reduce air pressure loss.

One aspect of the present invention is a tubular air cleaner for an internal combustion engine arranged in an intake air passage of the internal combustion engine. The tubular air cleaner includes a tubular housing and a tubular filter element. The tubular housing includes a circumferential wall including an inlet, a top wall including an outlet, and a bottom wall opposed to the top wall. The tubular filter element includes a tubular filter portion and is accommodated in the housing. A frame is arranged at an inner side of the filter portion to maintain shape of the filter portion. A planar adsorbent filter, which adsorbs evaporated fuel of the internal combustion engine, extends in an axial direction of the filter portion and is fixed to the frame. The inner surface of the filter portion is spaced apart from each of opposite planes of the adsorbent filter by a gap that allows air to reach the outlet without passing through the adsorbent filter.

Another aspect of the present invention is a tubular filter element including a tubular filter portion and accommodated in a housing of an air cleaner for an internal combustion engine. A frame is arranged at an inner side of the filter portion to maintain shape of the filter portion. A planar adsorbent filter, which adsorbs evaporated fuel of the internal combustion engine, extends in an axial direction of the filter portion and is fixed to the frame. The inner surface of the filter portion is spaced apart from each of opposite planes of the adsorbent filter by a gap that allows air to flow out of the air cleaner without passing through the adsorbent filter.

With this structure, when air flows through the filter element into the inner side of the filter element, the air is allowed to reach the outlet without passing through the adsorbent filter. Thus, when air flows through the inner side of the filter element, an increase in the flow resistance caused by the adsorbent filter will be limited. Consequently, the air pressure loss is reduced.

With the above structure, the adsorbent filter is arranged on the frame that maintains the shape of the filter portion. Thus, the adsorbent filter is replaced together with the filter element.

Additionally, the adsorbent filter may be set to any position in the axial direction of the filter portion. This increases the degree of freedom for arranging the adsorbent filter.

Other aspects and advantages of the embodiments will become apparent from the following description, taken in conjunction with the accompanying drawings, illustrating by way of example the principles of the invention.

DESCRIPTION OF THE EMBODIMENTS

One embodiment will now be described with reference to FIGS. 1 to 4.

Figure 1:
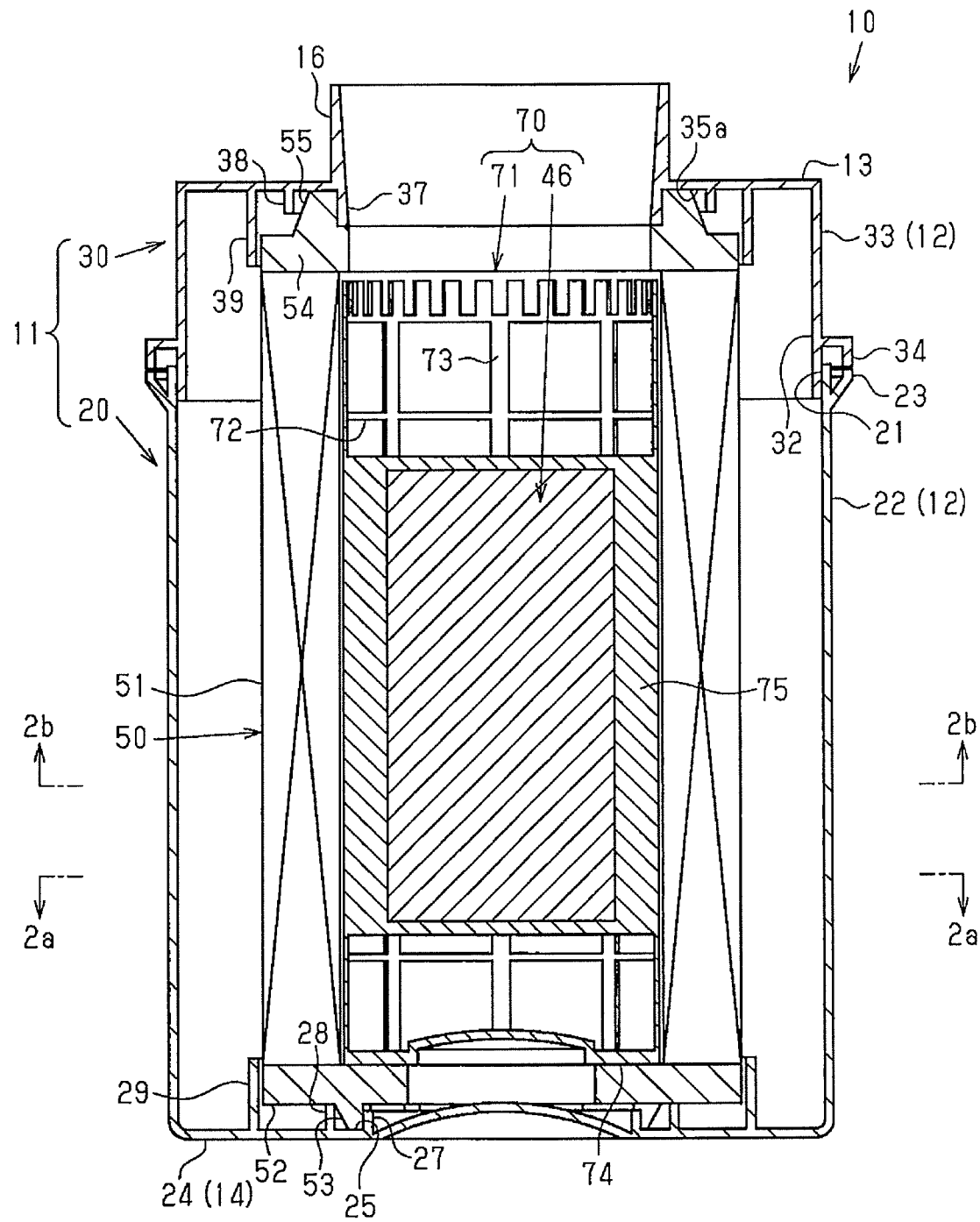
FIG. 1 is a vertical cross-sectional view showing one embodiment of a tubular air cleaner.
Figure 2A:
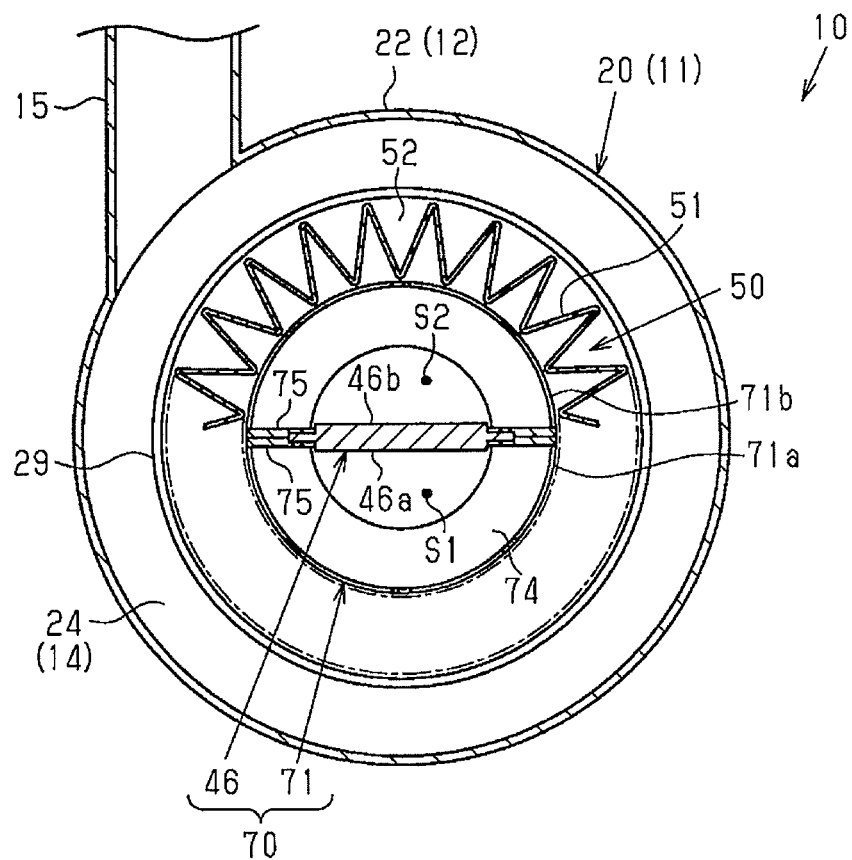
FIG. 2A is a cross-sectional view taken along line 2a-2a in FIG. 1.
Figure 2B:
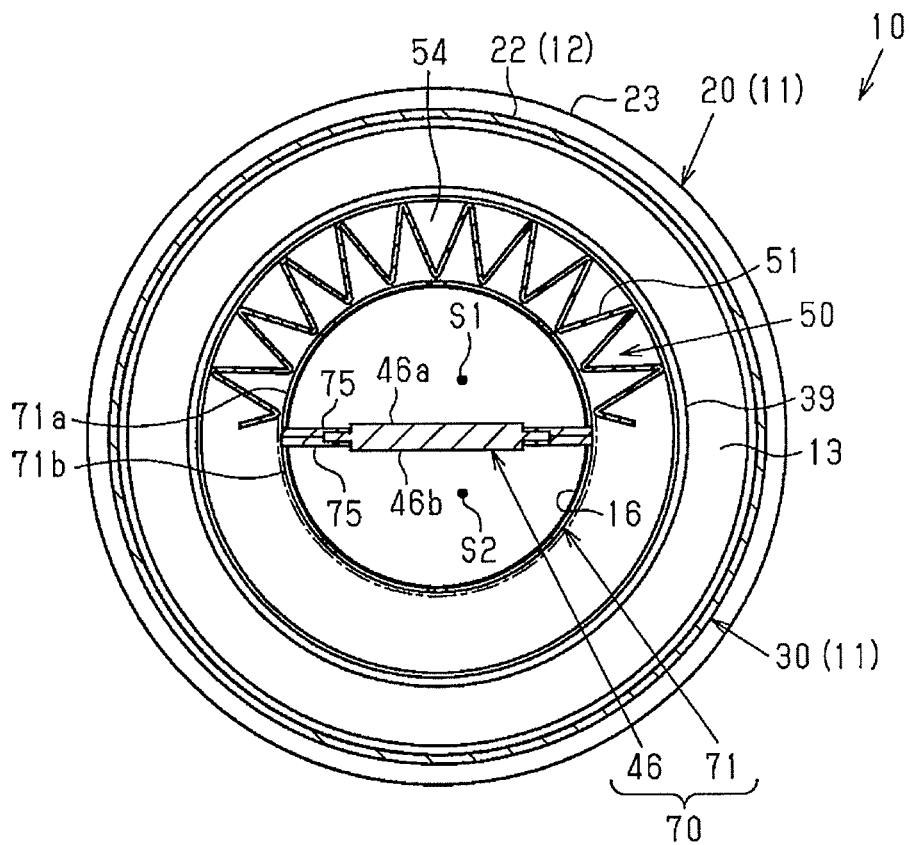
FIG. 2B is a cross-sectional view taken along line 2b-2b in FIG. 1.
Figure 3:
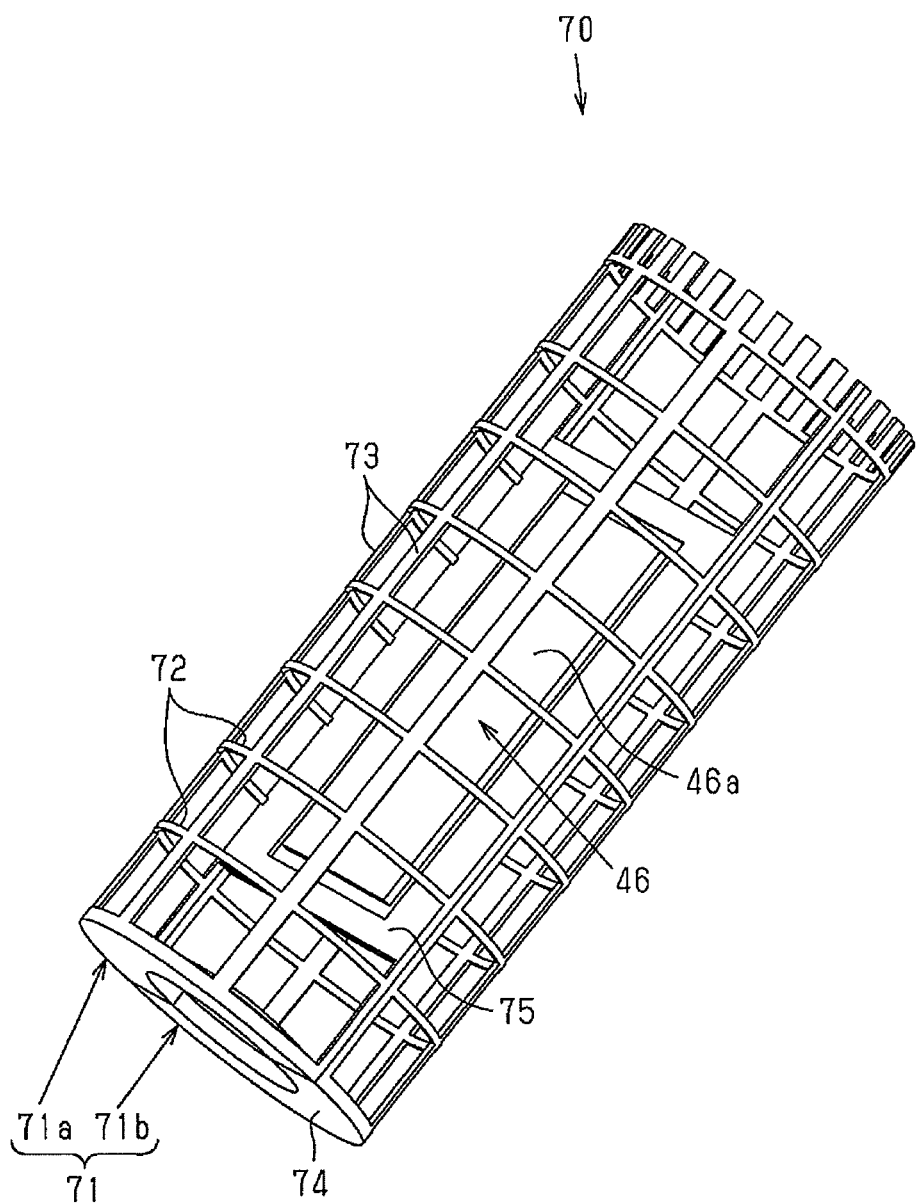
FIG. 3 is a perspective view showing an adsorbent filter assembly of the embodiment.

As shown in FIGS. 1, 2A, and 2B, a tubular air cleaner (hereafter, referred to as air cleaner 10) is arranged in an intake air passage of the internal combustion engine and includes a tubular housing 11. The tubular housing 11 includes a circumferential wall 12 including an inlet 15, a top wall 13 including an outlet 16, and a bottom wall 14 opposed to the top wall 13. A tubular filter element 50 is accommodated in the housing 11.

Filter Element 50

As shown in FIGS. 1, 2A, and 2B, the filter element 50 includes a pleated tubular filter portion 51, which is formed by pleating a filter medium sheet such as a non-woven cloth or filter paper, a first sealing portion 52, and a second sealing portion 54, each of which is discoid and has a center hole. The first sealing portion 52 and the second sealing portion 54 are located on one end and another end of the filter portion 51 in an axial direction.

A substantially tubular framework 71 is located at an inner side of the filter portion 51 to maintain the shape of the filter portion 51. Opposite ends of the framework 71 in the axial direction are sandwiched between and fixed to the first sealing portion 52 and the second sealing portion 54.

As shown in FIG. 1, the first sealing portion 52 has an end surface that is formed integrally with a plurality of projections 53 arranged at intervals in the circumferential direction. The second sealing portion 54 has an end surface that is formed integrally with an annular projection 55.

Housing 11

The housing 11 includes a case 20, which includes a portion of the circumferential wall 12 and the bottom wall 14, and a cap 30, which includes a portion of the circumferential wall 12 and the top wall 13 and is coupled to the case 20 in a removable manner.

The case 20 and the cap 30 will now be described in detail.

Case 20

As shown in FIGS. 1, 2A, and 2B, the case 20 includes a tubular case circumferential wall 22, which extends around an opening 21. A case flange 23 is formed in the entire circumferential edge of the case 20 defining the opening 21.

As shown in FIGS. 1 and 2A, the case 20 includes a case bottom wall 24, which defines the bottom wall 14 of the housing 11, and the tubular inlet 15, which projects from an outer circumferential surface of the case circumferential wall 22 and communicates the inside of the case 20 to the outside of the case 20.

As shown in FIG. 1, the inner surface of the case bottom wall 24 includes an inner projection 27, an intermediate projection 28, and an outer projection 29, which are annular and concentric with each other about the central axis of the case 20. The inner surface of the case bottom wall 24, the outer circumferential surface of the inner projection 27, and the inner circumferential surface of the intermediate projection 28 define an annular recess 25. The projections 53 of the first sealing portion 52 of the filter element 50 are fitted into the recess 25. Each projection 53 includes an end surface that contacts the inner surface of the case bottom wall 24 of the recess 25. This seals the space between the case 20 and the first sealing portion 52.

The outer projection 29 projects further than the inner projection 27 and the intermediate projection 28 toward the opening 21. The inner circumferential surface of the outer projection 29 is spaced apart from and opposed to the outer circumferential surface of the first sealing portion 52 in the radial direction.

The case 20 is formed from a rigid resin material.

Cap 30

As shown in FIG. 1, the cap 30 includes a tubular cap circumferential wall 33, which extends around an opening 32, the top wall 13, and the tubular outlet 16, which projects from an outer surface of the top wall 13 and communicates the inside of the cap 30 to the outside of the cap 30. A cap flange 34 is formed in the entire circumferential edge of the cap circumferential wall 33.

The inner surface of the top wall 13 includes an inner projection 37, an intermediate projection 38, and an outer projection 39, which are annular and concentric with each other about the central axis of the cap 30. The inner surface of the top wall 13, the outer circumferential surface of the inner projection 37, and the inner circumferential surface of the intermediate projection 38 define an annular recess 35a. The annular projection 55 of the second sealing portion 54 of the filter element 50 is fitted into the recess 35a. The annular projection 55 includes an end surface that contacts the inner surface (hereafter, may be referred to as sealing surface) of the top wall 13 of the recess 35a. This seals the space between the cap 30 and the second sealing portion 54.

The outer projection 39 projects further than the inner projection 37 and the intermediate projection 38 toward the opening 32. The inner circumferential surface of the outer projection 39 is spaced apart from and opposed to the outer circumferential surface of the second sealing portion 54 in the radial direction.

The cap 30 is formed from a rigid resin material.

Adsorbent Filter Assembly 70

As shown in FIGS. 1, 2A, 2B, and 3, an adsorbent filter assembly 70 includes the framework 71 and an adsorbent filter 46, which is fixed to the framework 71 to adsorb evaporated fuel of the internal combustion engine.

Although not shown in the drawings, the adsorbent filter 46 has the form of a rectangular plate and includes an adsorbent layer formed from activated carbon particles, two non-woven sheets holding the adsorbent layer in between, two glass fiber nets holding the two non-woven sheets in between, and two resin nets holding the two glass fiber nets in between. The entire periphery of the adsorbent filter 46 is thermally compressed defining a peripheral edge portion 47.

The framework 71 includes a plurality of rings 72, which are arranged at intervals in the axial direction with the centers aligned with the central axis of the filter portion 51, a plurality of straight portions 73, which extend along the central axis of the filter portion 51 and connect the rings 72, and a bottom portion 74, which is located at one end in the axial direction and connected to one end of each straight portion 73. The bottom portion 74 includes a center hole.

A looped rectangular holding portion 75 is coupled to an inner side of the framework 71.

Figure 4:
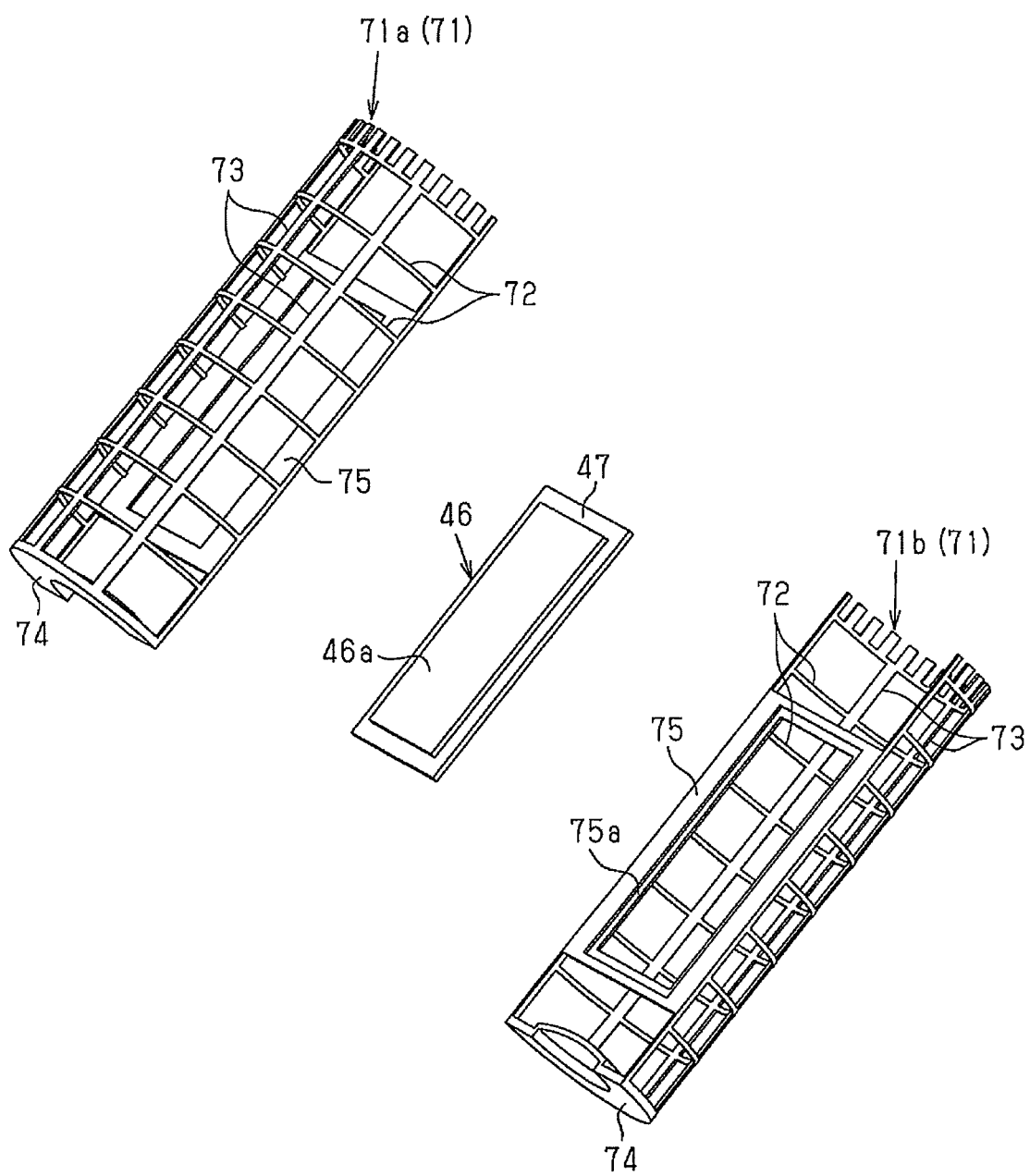
FIG. 4 is an exploded perspective view showing the adsorbent filter assembly of the embodiment including a first half tubular body, a second half tubular body, and an adsorbent filter.

As shown in FIG. 4, the framework 71, which includes the holding portion 75 of the present embodiment, includes a first half tubular body 71a and a second half tubular body 71b, which are formed separately from each other from a rigid resin material. The half tubular bodies 71a, 71b have surfaces opposed to each other, each of which includes an accommodation portion 75a. The accommodation portion 75a entirely extends around the inner periphery of the corresponding one of the half tubular bodies 71a, 71b to accommodate the peripheral edge portion 47 of the adsorbent filter 46.

With the peripheral edge portion 47 of the adsorbent filter 46 held between the accommodation portions 75a of the half tubular bodies 71a, 71b, the half tubular bodies 71a, 71b are bonded to each other, for example, through vibration welding. This forms the adsorbent filter assembly 70.

As shown in FIGS. 1, 2A, and 2B, the adsorbent filter 46 extends through the central axis of the filter portion 51 in the axial direction of the filter portion 51.

As shown in FIGS. 2A and 2B, the adsorbent filter 46 includes opposite planes 46a, 46b, which are spaced apart from the inner surface of the filter portion 51 of the filter element 50 by gaps S1, S2. The gaps S1, S2 allow air to reach the outlet 16 without passing through the adsorbent filter 46.

The present embodiment of the tubular air cleaner for an internal combustion engine and the tubular filter element has the advantages described below.

(1) The framework 71 is arranged at the inner side of the filter portion 51 to maintain the shape of the filter portion 51. The planar adsorbent filter 46, which adsorbs evaporated fuel of the internal combustion engine, extends in the axial direction of the filter portion 51 and is fixed to the framework 71. The inner surface of the filter portion 51 is spaced apart from the opposite planes 46a, 46b of the adsorbent filter 46 by the gaps S1, S2 that allow air to reach the outlet 16 without passing through the adsorbent filter 46.

With this structure, when air flows through the filter portion 51 of the filter element 50 into the inner side of the filter element 50, the air is allowed to reach the outlet 16 without passing through the adsorbent filter 46. Thus, when air flows through the inner side of the filter element 50, an increase in the flow resistance caused by the adsorbent filter 46 will be limited. Consequently, the air pressure loss is reduced.

Additionally, in the above structure, the adsorbent filter 46 is arranged on the framework 71, which maintains the shape of the filter portion 51. Thus, the adsorbent filter 46 may be replaced together with the filter element 50.

The adsorbent filter 46 may be set to any position in the axial direction of the filter portion 51. This increases the degree of freedom for arranging the adsorbent filter 46.

Additionally, the conventional case 20 and the conventional cap 30 may be used.

(2) The framework 71 includes the two half tubular bodies 71a, 71b. Each of the half tubular bodies 71a, 71b includes the holding portion 75, which holds the peripheral edge portion 47 of the adsorbent filter 46.

With this structure, when the peripheral edge portion 47 of the adsorbent filter 46 is held between the holding portions 75 of the two half tubular bodies 71a, 71b, the adsorbent filter 46 may be easily fixed to the framework 71.

(3) The holding portions 75 entirely extend around the adsorbent filter 46.

With this structure, the peripheral edge portion 47 of the adsorbent filter 46 is entirely held between the holding portions 75. Thus, the adsorbent filter 46 is assuredly fixed to the framework 71.

(4) The tubular filter element 50 includes the tubular filter portion 51 and is accommodated in the housing of an air cleaner for an internal combustion engine. The framework 71 is arranged at an inner side of the filter portion 51 to maintain the shape of the filter portion 51. The planar adsorbent filter 46, which adsorbs evaporated fuel of the internal combustion engine, extends in the axial direction of the filter portion 51 and is fixed to the framework 71. The inner surface of the filter portion 51 is spaced apart from the opposite planes 46a, 46b of the adsorbent filter 46 by gaps that allow air to flow out of the air cleaner without passing through the adsorbent filter 46.

With this structure, the same advantage as the advantage (1) may be obtained.

Modified Examples

The above embodiment may be modified as follows.

The layer structure of the adsorbent filter 46 may be changed, for example, by omitting the glass fiber nets. The material forming the adsorbent layer only needs to adsorb evaporated fuel. Thus, an adsorbent differing from activated carbon such as zeolite may be used.

The adsorbent filter 46 may be arranged so as not to extend through the central axis of the filter element 50.

The adsorbent filter 46 may be inclined from the axial direction of the filter element 50.

The holding portions 75 may hold only one, two, or three sides of the four sides of the peripheral edge portion 47 of the adsorbent filter 46.

The shape of the adsorbent filter 46 may be changed from the rectangular plate to, for example, a trapezoidal plate.

When the framework 71 is molded from a resin, the adsorbent filter 46 may be inserted so that the framework 71 and the adsorbent filter 46 are formed integrally with each other. The adsorbent filter 46 may be fixed to the framework 71 through adhesion.

The above embodiments are intended to be illustrative, and the present invention is not limited to the above-described embodiments. Various alternatives, modifications and variations are possible to the disclosed exemplary embodiments without departing from the spirit and scope of the present invention. For example, the subject matter of the present invention may exist in fewer features than all of the features of the particular embodiments disclosed. The claims are incorporated into the detailed description and each claim by itself claims a separate embodiment. The scope of the invention is intended to embrace all such alternatives, modifications and variations, along with all equivalents thereof, within the scope of the claims.

The invention claimed is:

1. A tubular air cleaner for an internal combustion engine arranged in an intake air passage of the internal combustion engine, the tubular air cleaner comprising:
    a tubular housing including a circumferential wall including an inlet, a top wall including an outlet, and a bottom wall opposed to the top wall; and
    a tubular filter element including a tubular filter portion and accommodated in the housing, wherein
    a frame is arranged at an inner side of the filter portion, wherein the frame maintains a shape of the filter portion,
    a planar adsorbent filter is provided within an interior of the frame and extends in an axial direction of the filter portion, wherein the planar adsorbent filter is fixed to the frame,
    the adsorbent filter adsorbs evaporated fuel of the internal combustion engine, and
    the filter portion includes an inner surface spaced apart from each of opposite planes of the adsorbent filter by a gap that allows air, which has flowed through the filter portion into an inner side of the filter element, to reach the outlet without passing through the adsorbent filter.

2. The tubular air cleaner according to claim 1, wherein the frame includes two half tubular bodies, and
    each of the half tubular bodies includes a holding portion that holds an edge of the adsorbent filter.

3. The tubular air cleaner according to claim 2, wherein the holding portion entirely extends around the adsorbent filter.

4. A tubular filter element accommodated in a housing of an air cleaner for an internal combustion engine, the tubular filter element comprising a tubular filter portion, wherein
    a frame is arranged at an inner side of the filter portion, wherein the frame maintains a shape of the filter portion,
    a planar adsorbent filter is provided within an interior of the frame and extends in an axial direction of the filter portion, wherein the planar adsorbent filter is fixed to the frame,
    the adsorbent filter adsorbs evaporated fuel of the internal combustion engine, and
    the filter portion includes an inner surface spaced apart from each of opposite planes of the adsorbent filter by a gap that allows air, which has flowed through the filter portion into an inner side of the filter element, to flow out of the air cleaner without passing through the adsorbent filter.

5. A tubular air cleaner for an internal combustion engine arranged in an intake air passage of the internal combustion engine, the tubular air cleaner comprising:
    a tubular housing including a circumferential wall including an inlet, a top wall including an outlet, and a bottom wall opposed to the top wall; and
    a tubular filter element including a tubular filter portion and accommodated in the housing, wherein a frame is arranged at an inner side of the filter portion, wherein the frame maintains a shape of the filter portion, a planar adsorbent filter extends in an axial direction of the filter portion and is fixed to the frame, the adsorbent filter adsorbs evaporated fuel of the internal combustion engine, and the filter portion includes an inner surface spaced apart from each of opposite planes of the adsorbent filter by a gap that allows air, which has flowed through the filter portion into an inner side of the filter element, to reach the outlet without passing through the adsorbent filter, wherein the frame includes two half tubular bodies, and each of the half tubular bodies includes a holding portion that holds an edge of the adsorbent filter.

6. The tubular air cleaner according to claim 5, wherein the holding portion entirely extends around the adsorbent filter.

\* \* \* \* \*